United States Patent [19]
Sharpe et al.

[11] Patent Number: 5,150,247
[45] Date of Patent: Sep. 22, 1992

[54] FIBER OPTIC TELECOMMUNICATION SYSTEM EMPLOYING CONTINUOUS DOWNLINK, BURST UPLINK TRANSMISSION FORMAT WITH PRESET UPLINK GUARD BAND

[75] Inventors: Randall B. Sharpe, Chapel Hill; J. Richard Jones, Raleigh; Thomas E. O'Shea, Chapel Hill, all of N.C.; Paul W. Casper, West Melbourne; James W. Toy, Melbourne, both of Fla.; Gregory M. Evans, Cary; Richard N. Sears, Raleigh, both of N.C.

[73] Assignee: Broadband Technologies, Inc., Research Triangle Park, N.C.

[21] Appl. No.: 429,083

[22] Filed: Oct. 30, 1989

[51] Int. Cl.⁵ .......................................... H04J 14/08
[52] U.S. Cl. ...................... 359/135; 359/136
[58] Field of Search ............... 174/37; 370/4, 85.7, 370/95.1–95.3; 358/86; 455/3–5, 612, 617; 359/135, 136, 140, 167, 118

[56] References Cited

U.S. PATENT DOCUMENTS

| | | | |
|---|---|---|---|
| 3,879,580 | 4/1975 | Schlosser | 370/95.3 |
| 4,553,161 | 11/1985 | Citta | 455/5 |
| 4,606,023 | 8/1986 | Dragoo | 370/4 |
| 4,813,012 | 3/1989 | Valeri | 455/619 |

Primary Examiner—Edward L. Coles, Sr.
Assistant Examiner—Knife-Michael Negash
Attorney, Agent, or Firm—Evenson, Wands, Edwards, Lenahan & McKeown

[57] ABSTRACT

A fiber optic telecommunication system has master site linked to a plurality of subscriber interface sites by a single pair of optical fibers. Downlink messages are transmitted in a continuous TDM format over a first optical fiber from the master site to subscriber interface sites, and in a burst mode TDMA format over a second optical fiber from the subscriber interface sites to the master site. Each subscriber interface site is coupled to the optical fiber link by way of a multiple fan-out fiber coupling pedestal at a common location on the fiber pair. To prevent collisions between successive uplink bursts from the subscriber interface sites, a guard band separates successive uplink messages from one another. The guard band duration accommodates optical fiber transmission distance between the common location on the uplink optical fiber and the subscriber interface site whose differential optical fiber transmission distance from the common location is greatest. A subscriber location has a television decoder associated with the subscriber's television set, through which television channel selection signals are input by the subscriber for transmission from the subscriber interface site to the master site. Power is provided by way of a replaceable battery pack, housed in a subterrestrial bell jar configuration, effectively insulating the battery pack from extreme temperature changes and the intrusion of moisture.

20 Claims, 6 Drawing Sheets

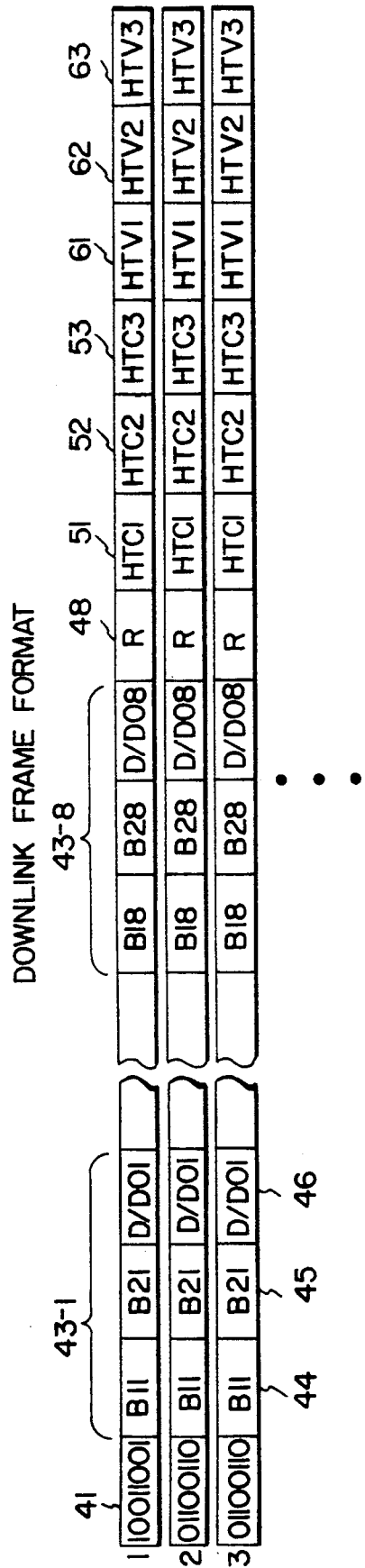
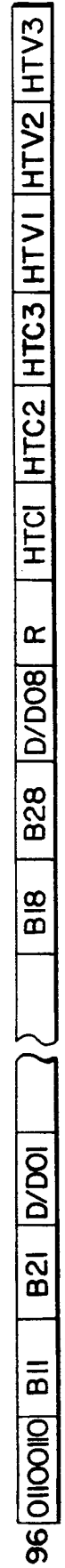
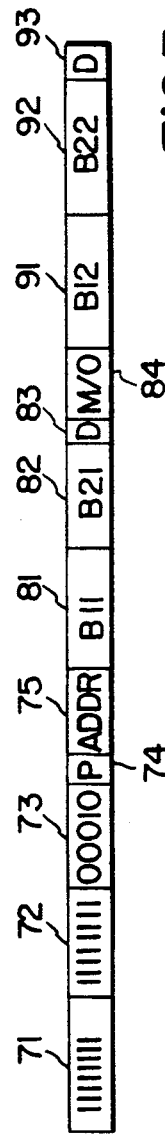
FIG. 2
FIG. 3

FIBER OPTIC TELECOMMUNICATION SYSTEM EMPLOYING CONTINUOUS DOWNLINK, BURST UPLINK TRANSMISSION FORMAT WITH PRESET UPLINK GUARD BAND

FIELD OF THE INVENTION

The present invention relates in general to fiber optic telecommunication systems and is particularly directed to a system configuration in which a multiplicity of individual home subscribers may request and receive selected television channel in addition to conducting telephony communications via an optical network interface. A plurality of such optical network interfaces are coupled to a common coupling location on each of a single pair of dedicated downlink and uplink optical fibers, so that a master site may serve an extended number of subscribers through a reduced complexity optical fiber network.

BACKGROUND OF THE INVENTION

Because of their increased bandwidth characteristics and robustness against noise, fiber optic networks have been proposed as a broadband replacement for a variety of communication systems, such as traditional 'copper wire' telephony networks and 'add-on' cable television distribution networks (which employ a separate, dedicated coax conductor cable). Unfortunately, proposals to date for implementing multi-service (broadband) optical fiber-based subscriber networks have been very costly. A fundamental factor in the high cost of such proposals has been the fact that they have typically involved the use of a large number of electro-optic and interconnect components, such as source and detector elements, which, when added to the cost of optical connectors and splices for the fiber links, and the quantity of optical fiber itself in the distribution cable between opposite ends of the link severely impact overall system expense. Namely because production requirements of these components are currently low, they are expensive. As a consequence, on a per-subscriber basis, the cost of such components amount to a large fraction of the price tag of an overall system, which, in addition to employing two transmitter/receiver pairs per subscriber, customarily uses a separate, dedicated pair of optical fibers within the distribution cable for each subscriber.

Faced with the costly outlay for the fiber optic components needed for the system, one course of thought has been to design signal processing and communication architectures that can handle a very large number of subscriber lines per unit and employ a highly compressed data format. Unfortunately, this approach is somewhat self-defeating since, in order to spread out the cost of the fiber optic components over a large number of subscribers, the system architecture becomes highly complex and therefore aggravate the cost problem, rather than alleviating it.

SUMMARY OF THE INVENTION

In accordance with the present invention, the high cost and complexity of previously proposed fiber optic communication systems is reduced considerably by a time division multiplexed communication scheme in which a telecommunications master site is linked to a plurality of geographically remote and separated subscriber interface sites by means of a single pair of optical fibers. Specifically, telecommunication messages (containing both telephonic and television channel-representative digital signals) are transmitted in a continuous time division multiplex format over a first optical fiber from the master site to a plurality of subscriber interface sites, and in a burst mode time division multiple access format over a second optical fiber from the plurality of subscriber interface sites to the master site. Each subscriber interface site is associated with a respective subscriber household location, and is coupled to the downlink (master-to-subscriber interface) fiber through a first multiple fan-out, optical splitter device located at a first common 'split' point on the downlink fiber, and to the uplink (subscriber interface-to-master) fiber through a second multiple feed-in optical combiner device located at a second common 'combine' point on the uplink fiber.

At the master site, digitally formatted telecommunication signal frames, each of which contains telephony signals (digital subscriber line data) from associated digital subscriber line equipment, a plurality of telephony signalling channels and a plurality of television channels, are transmitted in a continuous time division multiplex format as downlink messages over the downlink optical fiber to each of the subscriber interface sites. The contents of the television channels within the downlink are selected in response to subscriber channel selection requests contained within uplink burst messages that have been transmitted over the uplink fiber from the subscriber interface sites. Each of the downlink messages identifies the subscriber interface site for whom the message is intended and specifies which digital subscriber line packets are directed to it. The recipient subscriber interface site demultiplexes the contents of the message and (via signal interface units) routes the respective television channel signals and telephony signals to destination equipment (e.g. TV set top decoder, telephone handset).

The channel selection mechanism at the master site preferably includes an AC-coupled distribution bus to which a plurality of (e.g. sixty-four scrambled) television channels are supplied. The television channel distribution bus is terminated through a termination impedance to a prescribed reference voltage, and is coupled to one input of each of a plurality of (CMOS logic) comparator circuits, for selecting up to a prescribed number (e.g. twenty-four) of requested television channel signals for transmission as part of the television portion of the downlink.

Uplink signals are generated at the subscriber interface sites in time division multiple access burst format. Within preassigned time slots of successive uplink burst cycles, the subscriber interface sites are given the opportunity to transmit a digital subscriber line data packet containing two samples for each of a pair of telephony channels. Each uplink burst cycle contains a pair of additional channels that are accessible by the subscriber interface sites on a contention basis, for network control and television channel request purposes. To prevent collisions between successive uplink slotted signal bursts from the plural subscriber interface sites, a prescribed guard band is used to separate successive uplink time slots from one another. The nominal duration of the guard band is set to accommodate the longest optical fiber transmission distance difference from the common 'combine' point on the uplink optical fiber and the various subscriber interface sites.

A respective subscriber location has a television converter, associated with the subscriber's television set, through which television channel selection signals are input by the subscriber for transmission from the subscriber interface site to the master site, thereby selecting a television channel to which the television set is to display. The television converter generates television channel selection signals for transmission to the subscriber interface site by amplitude shift-keying a clock signal recovered from the television signals coupled from the subscriber interface site to the subscriber's television converter.

Because the present invention supplants existing (e.g. buried) copper wire cable, electrical power to the equipment must be provided locally, preferably by way of a replaceable battery pack. Due to the wide temperature range to which the equipment site can be expected to be exposed, even though protectively housed, a short battery life, necessitating frequent replacement, can be anticipated. To significantly reduce this problem and effectively extend battery life, a further feature of the present invention is to house the battery pack in a subterrestrial bell jar configuration, which facilitates access to the battery pack, while effectively insulating the battery pack from extreme temperature changes and the intrusion of moisture.

BRIEF DESCRIPTION OF THE DRAWINGS

FIG. 2 illustrates the manner in which downlink time division multiplex messages are digitally formatted as a frame of data;

FIG. 3 shows the format of a slotted uplink message burst;

DETAILED DESCRIPTION

Figure 1:
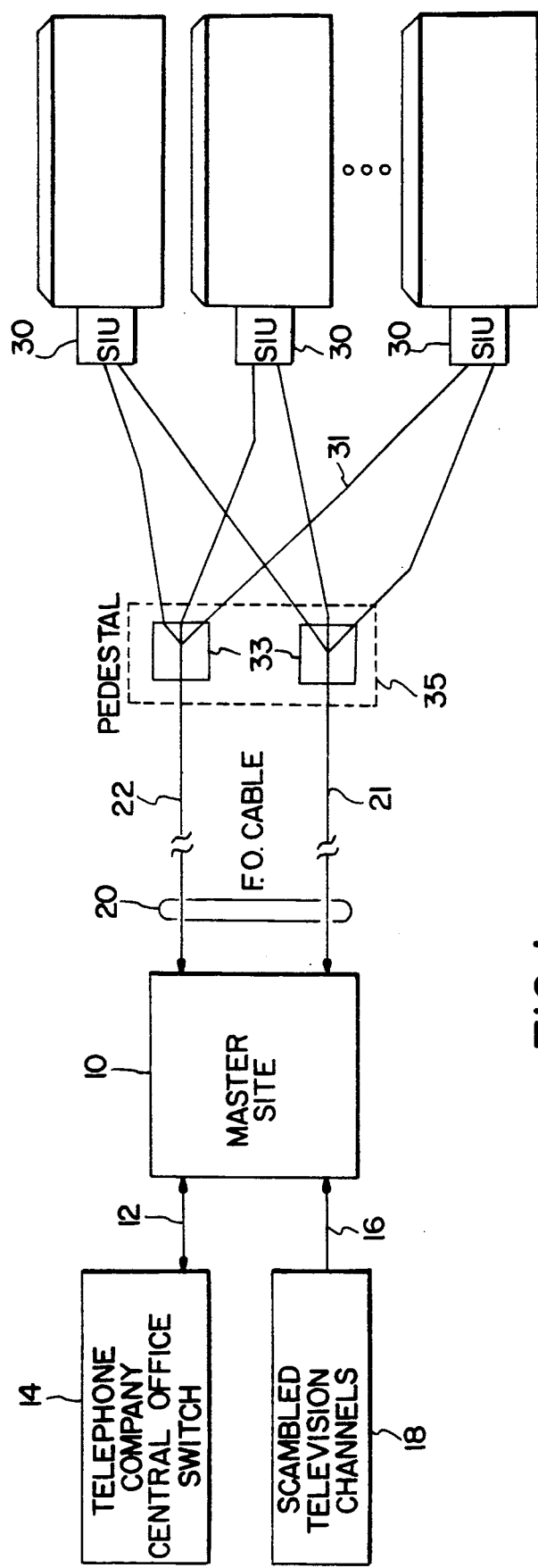
FIG. 1 diagrammatically illustrates the network architecture of a fiber optic telecommunication system in accordance with the present invention.

Before describing in detail the particular improved fiber optic telecommunication system in accordance with the present invention, it should be observed that the present invention resides primarily in a novel structural combination of conventional signal processing and (optical) communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, the fiber optic telecommunication system in accordance with the present invention is diagrammatically illustrated as comprising a master site 10, which is coupled via a (copper wire or fiber optics) telephony link 12 to a digital subscriber telephone communication network, for example, to a central office 14 and, via a link 16, to a source 18 of encoded and scrambled digital television signals. For purposes of the present description, link 16 may carry sixty-four available television channels. Master site 10, the details of which will be described below with reference to FIG. 4, sources 'downlink'-directed telecommunication messages, in the form of continuous time division multiplex optical signals over the downstream fiber 21 of a duplex optical fiber pair 20, to a plurality of (e.g. eight) remote subscriber interface sites 30 (to be described in detail below with reference to FIG. 5), such as individual subscriber dwellings or households, which are geographically separated from one another. Each of subscriber interface sites 30 is coupled to fiber optic pair 20 by way of its own associated fiber optic pair 31 and a respective optical fiber splice-connector 33 within a local optical coupler pedestal 35. By 'local' is meant that pedestal 35 is within some local neighborhood distance of each of subscriber interface sites 30 (e.g. 500-1000 meters), but is 'remote' (e.g. on the order of 5 km) with respect to master site 10. Master site 10 is also coupled to the upstream optical fiber 22 of duplex optical fiber pair 20 from the plurality of subscriber interface sites 30 to the master site.

As pointed out above, the master site is interfaced with both telephony and television signals and sources downlink telecommunication messages over optical fiber 21 to each of the plurality of subscriber interface sites 30, in a continuous time division multiplex format. For purposes of the present description, downlink messages may be digitally formatted as a frame of data, as shown in FIG. 2. As exemplary parameters, each frame may comprise thirty-two, eight-bit bytes of data, at a bit rate of 2.048 Mbps. Each frame of data is headed by an error tolerant (frame sync) preamble byte 41, followed by a sequence of three byte 'triplets' 43-1 . . . 43-8, each of which contains a pair of information bytes 44, 45 and an overhead byte 46. Each pair of information bytes within a respective triplet packet is associated with or represents a respective (ISDN-based) digital subscriber line. A downlink message further contains a reserved byte 48, a set of three telephony signalling channel bytes 51, 52 and 53, and a set of three television channel bytes 61, 62 and 63. Telephony signalling channel bytes 51-53 inform the subscriber interface sites 30 which information bytes they are to couple to their subscriber line output ports and other network monitoring and control functions, while bytes 61-63 contain television-related signalling.

The format of a slotted uplink message burst is shown in FIG. 3 as containing a pair of preamble bytes 71,72, an error tolerant synchronization pattern 73, a parity bit 74, a source address byte 75, a first pair of digital subscriber line (voice sample) bytes 81, 82, a pair of overhead bits 83, 84 (e.g. ISDN-D channel, DSL M-channel), a second pair of digital subscriber line bytes 91, 92 and an additional overhead bit 93 (ISDN D channel). As pointed out previously, uplink message bursts from a subscriber interface site 30 are transmitted in TDMA fashion, with each subscriber interface site being assigned one of a plurality of time slots within an overall burst cycle for transmission of its burst message. For an exemplary network containing eight subscriber interface sites, the overall burst interval may comprise ten TDMA time slots, eight of which are assigned to the respective subscriber interface sites 30 and an additional pair of time slots that are accessible by the subscriber interface sites on a contention basis, for network control and television-related signalling.

In order to determine when it can transmit, each subscriber interface site 30 monitors the continuous sequence of downlink message packets and initializes an internal counter (not shown) with respect to the repeated framing reference preamble within the continuously transmitted downlink signal. This counter provides a basis for a determination of the uplink burst time slots. Each subscriber interface site is assigned one or several transmission time slots, so that each subscriber interface site will be given an opportunity to transmit return bursts on a periodic basis. Because of the differential separations between subscribe interface sites 30 and their connection points (via pedestal 35) to fiber pair 20, and the associated propogation time of the optical signals in the fibers, which might lead to corruption of data resulting from a burst overlap, a time delay or guard band is provided between successive burst slots on the uplink fiber. The duration of the guard band is established in accordance with the greatest differential optical fiber transmission distance between optical coupler pedestal 35 and subscriber interface sites 30. Typically this differential distance will be less than 500 meters. As a consequence, with the speed of light in the fiber being on the order of five nanoseconds per meter, the guard band between each slotted upstream burst should be in excess of five microseconds. To allow for circuit delays and provide a reasonable safety factor, a guard band on the order of ten microseconds is preferred.

Figure 4:
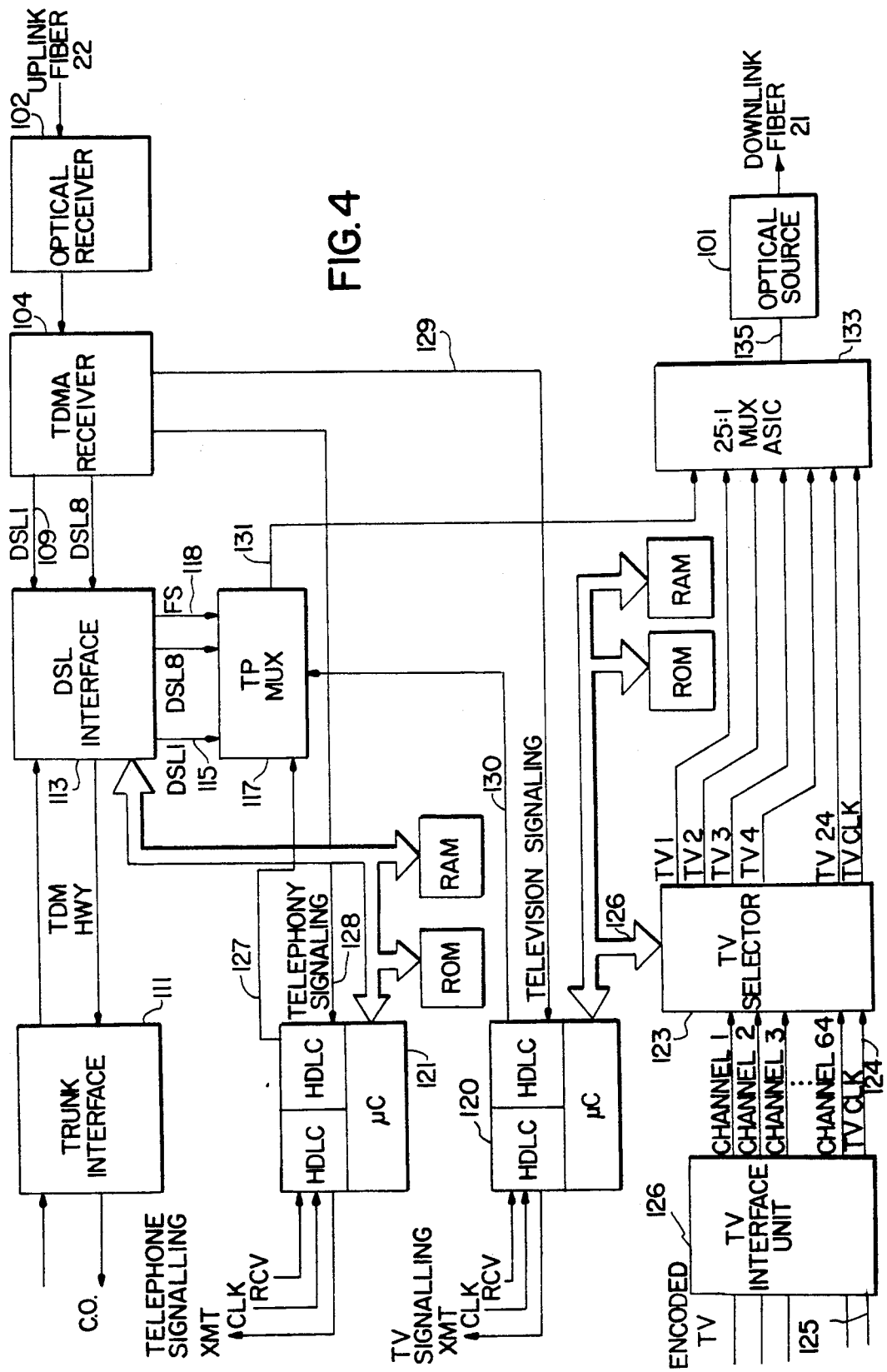
FIG. 4 shows the configuration of a master site.

Referring now to FIG. 4, the configuration of master site 10 is shown as comprising an optical transmitter 101 coupled to downlink optical fiber 21 and optical receiver 102 coupled to uplink optical fiber 22. Transmitter 101 and receiver 102 are both conventional fiber optic units for converting light signals into electrical signals and electrical signals to light signals, respectively.

Digital telephony signals which are to be transmitted to destination subscribers, are coupled, for example, from a central office through a trunk interface 111 to a digital subscriber line interface. These telephony signals may be data or encoded voice signals. Encoded voice signals may also contain embedded signalling information (on/off hook, ringing, etc.). If desired, a time-slot interchange function may be provided by microprocessor control of which channels of the TDM highway ar routed to which DSL. The DSLs 115 containing the assigned telephony channels, as well as other overhead information are coupled to a telephony multiplexer 117. Outgoing traffic (for delivery to the central office trunk) is received and time expanded by the TDMA receiver 104 and coupled to the DSL interface 113. Frame synchronization signal FS 118 synchronizes the telephony multiplexer to the system timing.

Operation of master site 10 is supervised by microprocessors 120 and 121. Microprocessor 121 controls the time-slot assignment of the DSL interface 113, and communicates with subscriber interface sites 30 through signalling channel 127 which is embedded within downlink 21. A TDMA time segment from the subscriber interface sites 30 carries the return communication from uplink 22 through the TDMA receiver 104 to microprocessor 121 over signalling channel 128. In an analogous fashion, microprocessor 120 controls the TV channel selections of TV selector 123 over microprocessor bus 126, and communicates with subscriber interface sites 30 through signalling channel 130. A TDMA time segment from the subscriber interface sites 30 carries the return communications from uplink 21 through TDMA receiver 104 to microprocessor 120 over signalling channel 129.

The output of telephony multiplexer 117 is coupled over link 131 to one input of TDM multiplexer 133, an additional number of N (e.g. twenty-four) inputs to which are derived from N output ports of television channel selector 123. Television channel selector 123, to be described in detail below with reference to FIG. 6, preferably interfaced to a capacitively-coupled distribution bus to which scrambled television channels from interface unit 126 are AC-coupled, the bus being terminated through a termination impedance to a reference voltage (e.g. 2.5 volts), and includes a plurality of CMOS comparator circuits, which are coupled to the bus and the voltage reference. The outputs of the comparator circuits are controllably gated by microcontroller 120 to the inputs of multiplexer 133. The distribution bus of channel selector 123 has a plurality of M (e.g. sixty-four) input ports 124 coupled, via a TV channel interface unit 126, to a set of television encoder lines 125 which receive the M encoded (scrambled) television channels. TV selector unit 123 selectively couples any of the M encoded television channels to any number of its N output ports, under the control of microcontroller 120. TDM multiplexer 133 multiplexes N outputs of television channel selector 123 and the telephony channel contents of link 131 to its output 135 in the course of the assembly of a downlink message for transmission by optical transmitter 101 over downlink optical fiber 21 to subscriber interface sites 30.

Figure 5:
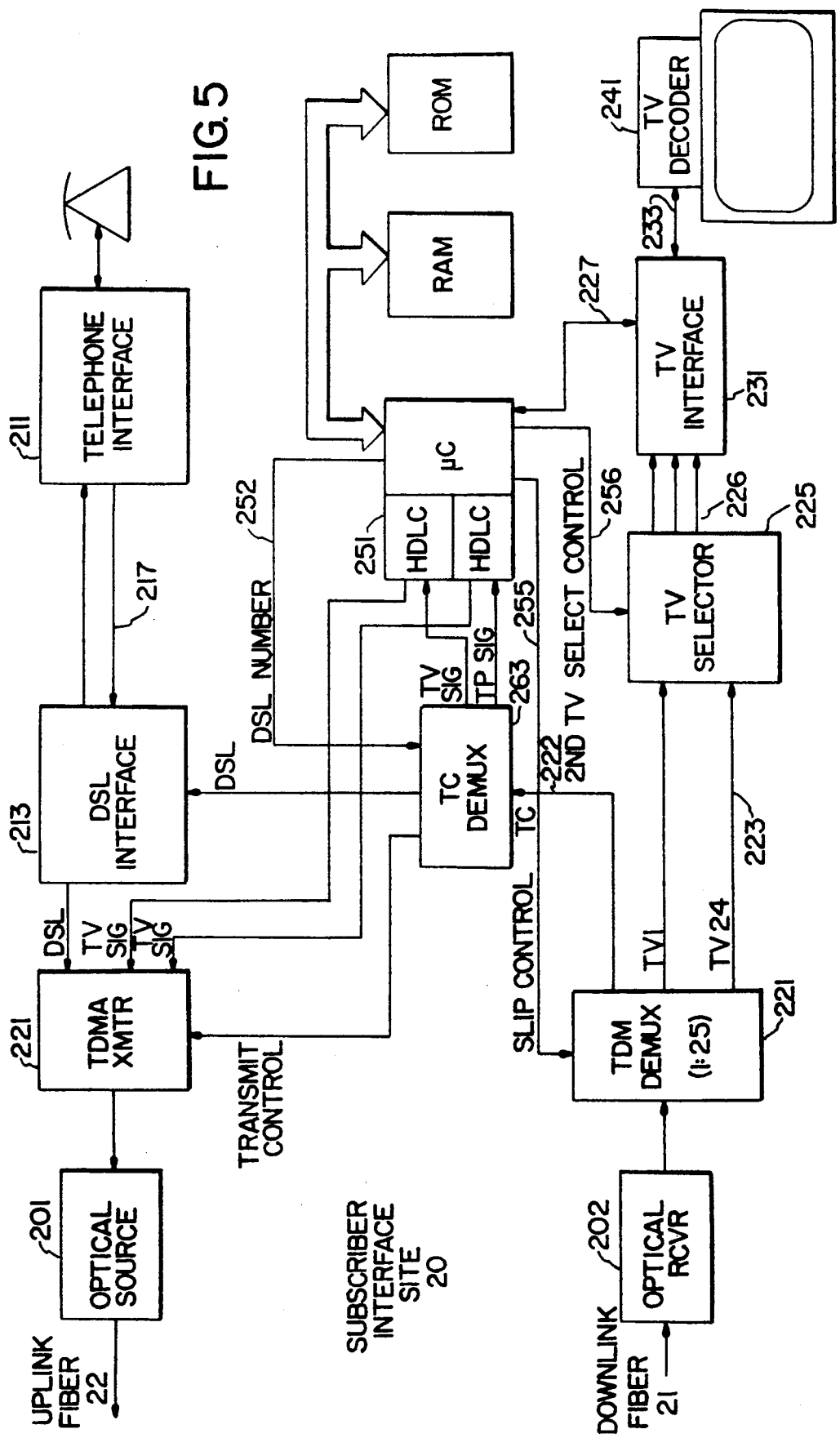
FIG. 5 shows the configuration of a subscriber interface site.

The configuration of a subscriber interface site 30 is illustrated in FIG. 5 as comprising an optical transmitter 201, which is coupled to uplink optical fiber 22, and an optical receiver 202 which is coupled to downlink optical fiber 21. Telephony signals (subscriber line signals) from an associated telephone unit (handset), which are to be transmitted to the central office, are coupled through a telephone interface 211 to a digital subscriber line interface unit 213. Telephone interface 211 encodes the voice signals and signalling into conventional PCM format. DSL interface 213 interfaces incoming downlink subscriber telephony traffic in the form of digital subscribe lines from master site 10, with the subscriber's handset (via telephone interface 211) and outgoing signals from the subscriber's handset over link 217 for application to TDMA transmitter 221.

Incoming TDM signals from master site 10 are output from optical receiver 202 to a TDM demultiplexer 221, which couples television channel signals over N output links 223 to an optional, second television selector 225 and telephony signals over link 222 to a telephony demultiplexer 263. Television channel selector 225, which allows greater sharing of the N channels on downlink 21, has a plurality of P (e.g. three) output ports coupled, via links 226 and a TV interface unit 231, to television transmission lines 233 for coupling received encoded television channel signals to one or more television decoder (or converter) units 241 associated with television sets served by the system. To facilitate the transmission of channel selection request signals by the customer, (e.g. via television channel selection equipment (e.g. remote control selector)), a decoder unit preferably amplitude shift-keys (ON-OFF keys) the recovered clock (e.g. 180 MHz) embedded within the incoming television channel signals in accordance with the requested channel number to generate a digital code readily accepted by microcontroller 251.

Like microcontroller 121 at master site 10, microcontroller 251 supervises the operation of the components of the subscriber interface site. For this purpose, microcontroller 251 has control links 252, 255 and 256 coupled to TC demultiplexer 263, TDM demultiplexer 221 and the second television channel selector 225, respectively. Communication with the TV decoder takes place over link 227 via the TV interface 231.

Operation of the system may be best understood by considering downlink and uplink transmissions separately.

DOWNLINK (MASTER-TO-SUBSCRIBER INTERFACE SITE) MESSAGES

As pointed out above, master-to-subscriber signalling is effected by means of a continuous TDM transmission format, consisting of several digital subscriber line signals, telephony signalling channels, and television signalling channels, multiplexed together to form sequential messages formatted as shown in FIG. 2 under the control of microcontroller 121. This continuous sequence of telephony and television data frame is over-sampled and multiplexed with the digital TV signals and transmitted by optical transmitter 101 over downlink fiber 21 to pedestal 35, from which the signal is distributed to each of the subscriber interface sites 30. At each subscriber interface site the received signal derived by optical receiver 202 is demultiplexed by TDM demultiplexer 221 into respective telephony and television segments and coupled to telephony demultiplexer 263 and television channel selector 225, respectively.

As noted previously, the digital subscriber line bytes within a downlink message frame may be directed to a single subscriber interface site or to separate subscribers. Microcontroller 251 monitors the contents of signalling channel bytes 51-55 via link 266 and controls the operation of telephony multiplexer 261 to direct the digital subscriber line signals that are intended for that subscriber to interface 213. Television channel signals are output by selector 225 over link 226 to decoder circuits serving the television set(s) of the subscriber.

UPLINK (SUBSCRIBER-TO-MASTER SITE) MESSAGES

Subscriber-to-master site signalling is carried out in a slotted TDMA burst transmission format, shown in FIG. 3, with packets of telephony (digital subscriber line) signals from the subscriber's local telephone equipment assembled and transmitted by TDMA transmitter under the control of microcontroller 121. As noted above, in the present example, each uplink burst interval may contain ten successive time slots (one preassigned for each of eight subscriber sites and two additional communication and control contention slots). During its one of the preassigned eight time slots, each subscriber interface site's optical transmitter 201 transmits a burst message over uplink fiber 22 to pedestal 35, where it is optically combined with bursts from other subscriber interface sites 30, timed so as not to interface with one another.

As described above with reference to FIG. 3, during each uplink time slot, two digitally encoded voice samples from each of two telephone lines are packetized and transmitted. This short burst format is designed to satisfy the requisite echo path delay, while still maintaining an original objective of reduced complexity and costs. As noted previously, proposals to pack a considerably larger number (e.g. 128) of subscriber channels into one message requires the use of more complex system components, which makes installation and operation of the resulting network prohibitively expensive. Longer burst formats (additional voice samples/burst), on the other hand, do not meet maximum echo path delay requirements. The communication parameters described in the present example have been found to meet necessary echo path delay standards while, at the same time, providing a practical implementation of a fiber optic system.

At master site 10, each subscriber interface site-generated burst signal derived by optical receiver 102 is coupled over link 109 to DSL packet interface unit 113 for conversion to conventional TDM signals and eventual transmission to the central office. A television channel request message that has been transmitted in on of the pair of additional communication and control burst segments on a contention basis to the master site is coupled from the subscriber over link 129 to microcontroller 120, which outputs the requested change over link 126 to television channel selector 123.

As described briefly above, within master site 10, television selector 123 preferably interfaces to an AC-coupled distribution bus 124 to which a plurality of (e.g. sixty-four scrambled) television channels are available. The bus is terminated through a termination impedance to a prescribed voltage level (e.g. 2.5 volts) and is further connected to one input of each of a plurality of (CMOS logic) gated comparator circuits, for selecting up to a prescribed number of (e.g. twenty-four) requested television channel signals for transmission as part of a downlink message. By use of CMOS logic components, the need for expensive and power consuming ECL or other bipolar components, similar to those through which the scrambled TV signals are sourced, is obviated.

Figure 6:
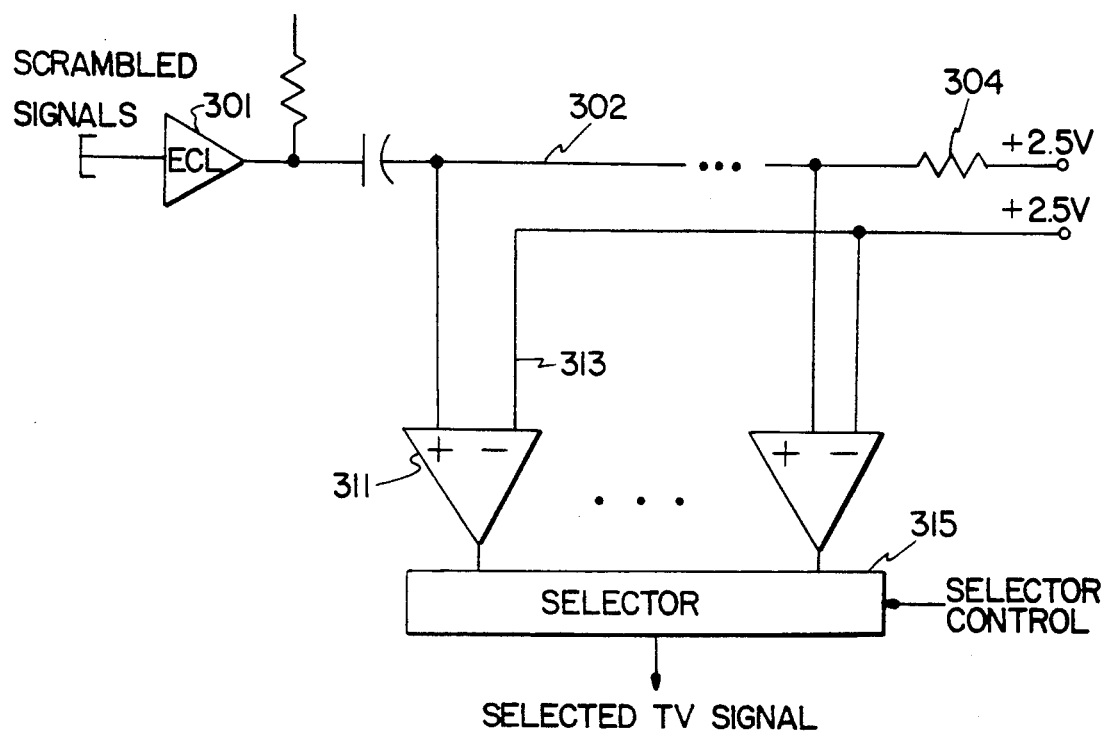
FIG. 6 diagrammatically illustrates the configuration of a television selector.

More particularly, with reference to FIG. 6, television signal interface unit 126 typically outputs the scrambled TV signals through an ECL driver 301. In accordance with the present invention, rather than configure selector 123 of ECL components, the overall cost and power consumption of which is substantial for a sixty-four channel system, advantage is taken of the fact that the effective D.C. level of the scrambled TV signals is nearly constant, so that the signals may be capacitively (AC)-coupled without loss of information and permitting interfacing to reduced power components, such as low cost CMOS devices.

Specifically, the sixty-four channels of scrambled video are capacitively-coupled to a video channel bus 302, which is terminated through impedance 304 to a suitable CMOS operational voltage (2.5 V) and coupled to one input of each of a plurality of CMOS-configured comparator circuits 311, respectively associated with each of the video signal channels. The other input of each comparator circuit is coupled in common through voltage reference line 313 to the (2.5 volt) reference. The output of each comparator circuit 311 is now compatible with the logic levels of low cost, low power CMOS logic. The controlled selection of the output of comparator circuit 311 is represented by selector 315, the control input for which is decoded from link 126 from microcontroller 120.

Because the present invention replaces existing (e.g. buried) copper wire cable, electrical power to the equipment must be provided locally preferably b way of a replaceable battery pack. Due to the wide temperature range to which the battery can be expected to be exposed, even though protectively housed, it is foreseeable that battery life will be short, necessitating frequent replacement. To significantly reduce this problem and prolong battery life, a further feature of the present invention is to house the battery pack in a subterrestrial bell jar configuration, diagrammatically illustrated in FIG. 7.

Figure 7:
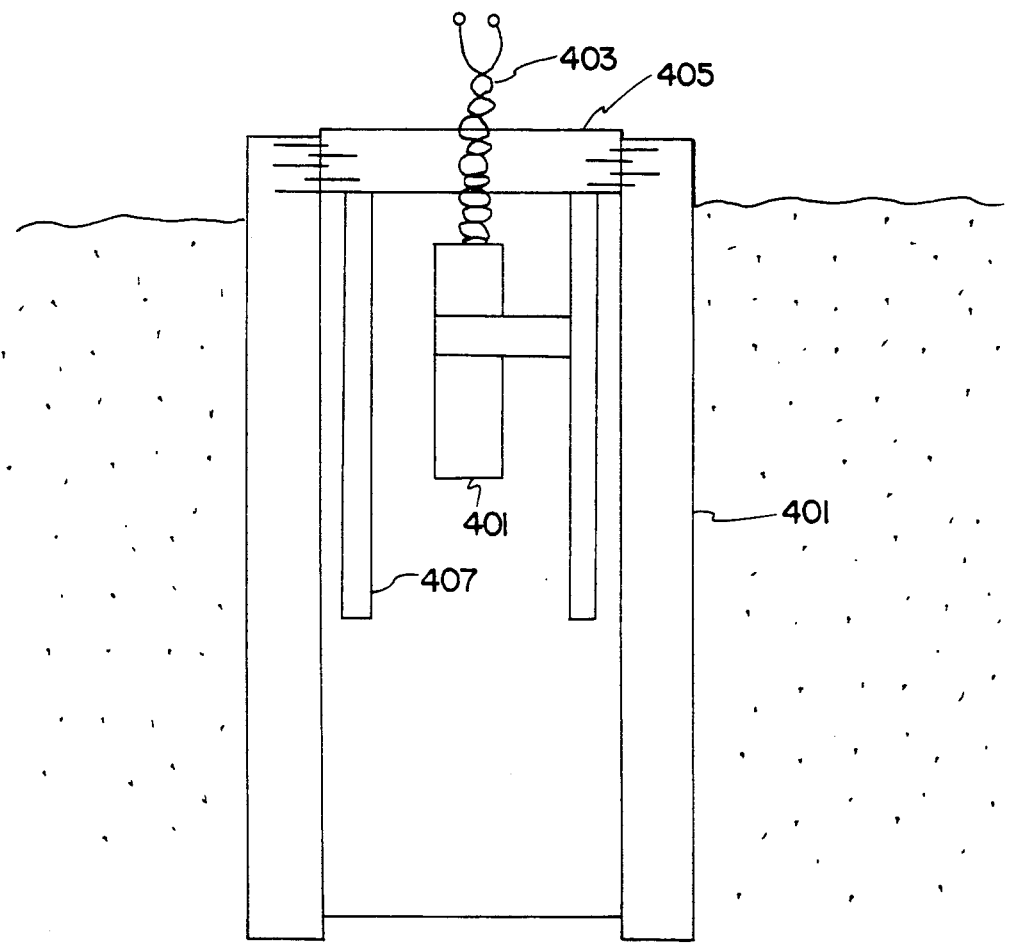
FIG. 7 diagrammatically illustrates the bell jar configuration of a battery pack housing.

Specifically, FIG. 7 shows a battery pack 401 having a set of terminal leads 403 extending from a top end of the pack and passing through a hermetically sealed bore within a threaded lid 405 that is secured to the top of a generally cylindrical tubular member 407. To facilitate construction, cylinder 407 and lid 405 may be formed of polyvinyl chloride plastic. Cylinder 407 has a diameter less than that of lid 405 and may be bonded to the underside of the lid at an end region 409. The inner hollow diameter of cylinder 407 receives the battery pack, which may be clamped within the cylinder to assist in retaining the battery within the housing. The axial length of cylinder 407 is sufficient to accommodate the length of battery pack 401, but is less than that of a surrounding, outer tubular, generally cylindrical sleeve 411. Although each of tubular members 407 and 411 are generally cylindrical they may also be of other shapes. A cylindrical shape is preferred to facilitate construction. Outer sleeve 411 is internally threaded at its top end and is sized to receive and mate with the threads of lid 405, so as to secure the battery pack in place within the bell jar-configured housing. The length of outer sleeve 411 is considerably longer than that of cylinder 407, so as to provide an axial separation between the bottom ends of cylinder 407 and outer sleeve 411.

In its installed configuration, the housing unit is inserted into a hole in the ground with outer sleeve 411 preferably in the proximity of (e.g. slightly above) the earth's surface, so as to permit access to the interior of the housing and the battery pack through the removal of lid 405. The housing unit is upright or vertical, so as to form an interior bell jar arrangement in which battery pack 401 is protected from intrusion of moisture by the column pressure within cylinder 407. Because the battery pack is supported below ground level, where temperature extremes are reduced compared to the atmosphere, the battery pack is effectively insulated from adverse temperature changes and the intrusion of moisture.

As will be appreciated from the foregoing description, the above-referenced shortcomings of previously proposed broadband fiber optic subscriber networks, which typically incorporate a large number of expensive electro-optic and interconnect components, are substantially reduced in accordance with the present invention by means of a telecommunication mechanism that is readily compatible with single fiber links and which permits multiple users to be readily interfaced with the system at reduced cost. By combining continuous downlink, burst uplink communication formats and defining a prescribed uplink guard band based upon maximum link separation distance to separated subscriber units, a reduced complexity system configuration for integrating both telephony and video channels is achieved.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A fiber optic communication system for conveying telecommunication messages over a first optical fiber from a master site to a plurality of remote sits, geographically separated from one another, and over a second optical fiber from said plurality of remote sites to said master site, said remote sites being coupled to said first optical fiber by way of a first fiber coupling device at a first common location on said first optical fiber, and to said second optical fiber by way of a second fiber coupling device at a second common location on said second optical fiber, said system comprising:

at said master site,
first means, to which a plurality of telecommunication channels are coupled and being coupled to said first optical fiber, for transmitting first messages over said first optical fiber to said plurality of remote sites in a continuous time division format, said first messages containing first telecommunication signals and identifying remote sites for whom said first telecommunication signals are intended, and second means, coupled to said second optical fiber, for receiving successive bursts of second messages transmitted from remote sites, said second messages containing second telecommunication signals from remote sites and identifying the remote sites sourcing said second telecommunication signals; and at a respective remote site,
third means, coupled to said second optical fiber, for transmitting said second messages over said second optical fiber to said master site in time division multiple access format, in which a respective second message is separated from another, successive second message, by a guard band having a duration defined in accordance with a differential optical fiber transmission distance between said second common location on said second optical fiber and first and second ones of said remote sites whose optical fiber transmission distances from said second common location are most different from each other, and the second messages have durations which are defined in accordance with echo path delay requirements through the system.

2. A fiber optic communication system according to claim 1, wherein at least one of said first and second telecommunication signals contain at least one of digital data, digital telephone voice channel and digital television signals.

3. A fiber optic communication system according to claim 2, wherein said first telecommunication signals further contain prescribed high speed digital signals, such as digital television signals, request for the transmission of which have been received from remote sites, and wherein said second messages include request messages requesting said master site to transmit specified high speed digital signals, such as specified digital television channel signals in said first messages.

4. A fiber optic communication system according to claim 3, wherein said first means includes controllable selector means, coupled to receive a plurality of high speed digital channels, such as a plurality of M digital television channels and having a plurality of N outputs, for coupling any of said plurality of M channels to any number of said N outputs, and multiplexer means, coupled to the N outputs of said selector means, for coupling selected ones of the digital channels at the N outputs of said selector means for transmission as part of a first message over said first optical fiber to said remote sites.

5. A fiber optic communication system according to claim 3, wherein backup electrical power for a respective remote site is provided by way of a battery unit contained within a protective subterranean housing arrangement at said remote site, said protective subterranean housing arrangement comprising a first, interior chamber defined by a first interior tubular member, a second exterior chamber defined by a second, exterior tubular member, surrounding said interior tubular member, a cover member sealing one end of said interior tubular member and being secured to one end of said exterior tubular member, said battery unit being retained within said interior tubular member, said arrangement being supported in a subterranean vertical position so as to form a bell jar-configured housing surrounding and protecting said battery unit from the subterranean intrusion of standing water by column pressure within said interior tubular member.

6. A fiber optic communication system according to claim 1, wherein said third means includes means for transmitting a second message in accordance with a prescribed time count associated with that remote side and initiated from a timing reference within the continuous time division format of said first messages.

7. A fiber optic communication system for conveying telecommunication messages over a first optical fiber from a master site to a plurality of remote sites, geographically separated from one another, and over a second optical fiber from said plurality of remote sites to said master site, said remote sites being coupled to said first optical fiber by way of a first fiber coupling device at a first common location on said first optical fiber, and to said second optical fiber by way of a second fiber coupling device at a second common location on said second optical fiber, said system comprising:

at said master site,
first means, to which a plurality of high speed digital channels, such as a plurality of television channels are provided, and being coupled to said first optical fiber, for transmitting first messages over said first optical fiber to said plurality of remote sites, said first messages containing high speed signals, such as television signals, requests for transmission of which have been received from remote sites, and second means, coupled to said second optical fiber, for receiving successive bursts of second messages transmitted from remote sites, said second messages having durations defined in accordance with echo path delay requirements through the system and containing channel request messages requesting said master site to transmit high speed signals, such as specified television channel signals as part of said first messages, and identifying the remote sides sourcing said second messages; and at a respective remote site,
third means, coupled to said second optical fiber, for transmitting said second messages over said second optical fiber to said master site in time division multiple access format.

8. A fiber optic communication system according to claim 7, wherein said third means includes means for transmitting said second messages over said second optical fiber to said master site in time division multiple access burst format such that a respective second message is separated from another, successive second message, by a guard band having a duration defined in accordance with a differential optical fiber transmission distance between said second common location on said second optical fiber and first and second ones of said remote sites whose optical fiber transmission distances from said second common location are most different from each other.

9. A fiber optic communication system according to claim 7, wherein said first means includes means for transmitting first messages over said first optical fiber to said plurality of remote sites in a continuous time division format, and wherein said third means includes means for transmitting a second message in accordance with a prescribed time count associated with that remote site and initiated from a timing reference within the continuous time division format of said first messages.

10. A fiber optic communication system according to claim 7, wherein at least one of said first and second messages further contain at least one of digital information signals and telephone voice channel signals.

11. A fiber optic communication system according to claim 7, wherein said first means includes controllable selector means, coupled to receive a plurality of high speed channels, such as a plurality of M digital television channels and having a plurality of N outputs, for coupling any of said plurality of high speed channels, such as M digital television channels to any number of said N outputs, and multiplexer means, coupled to the N outputs of said selector means, for coupling selected ones of high speed channels at the N outputs of said selector means for transmission as part of a first message over said first optical fiber to said remote sites.

12. A fiber optic communication system according to claim 11, wherein said selector means includes an AC-coupled distribution bus to which said plurality of high speed digital signals, such as a plurality of M digital television channels are AC-coupled at one end thereof, a second end of said coupled through a termination impedance to a prescribed voltage level, and said selector means includes a plurality of M comparator circuits, a first input of each of which is coupled to said distribution bus and a second input of which is coupled to receive said prescribed voltage level, and means, coupled to said comparator circuits, for controllably coupling the outputs thereof to the N outputs of said selector means.

13. A fiber optic communication system according to claim 12, wherein said selector means is configured of CMOS logic elements.

14. A fiber optic communication system according to claim 11, wherein said first and second messages contain at least one of digital telephone voice channel and digital data signals, and wherein said multiplexer means has an input coupled to receive said at least one of digital telephone voice channel and digital data signals, said multiplexer means controllably coupling selected ones of said at least one of digital telephone voice channel and digital data signals and the N outputs of said selector means for transmission as part of a first message over said first optical fiber to said remote sites.

15. A fiber optic communication system according to claim 11, wherein a remote site serves multiple subscriber locations via telecommunication links coupled therebetween, a respective subscriber location having a television decoder, associated with a subscriber's television set, through which television channel selection signals are input by the subscriber for transmission from the remote site to the master site, thereby selecting a television channel for said television set, and through which television signals for a selected television channel are interfaced from the remote site to the television set, said decoder including means for generating television channel selection signals for delivery to said remote site for transmission by said third means to said master site, said generating means comprising means for amplitude shift-keying a recovered frequency signal through which said television signals are coupled from said remote site to said subscriber location.

16. A fiber optic communication system according to claim 15, wherein a remote site further includes fourth means, coupled to said first optical fiber, for receiving first messages transmitted from said master site and demultiplexing the contents thereof for delivery to said multiple subscriber locations, said fourth means including means, coupled to receive a plurality of N television channels contained within said first messages and having a plurality of P outputs, for controllably coupling any of said plurality of N television channels to any number of said P outputs for delivery to P subscriber locations.

17. A fiber optic communication system according to claim 16, wherein said first and second messages contain at least one of digital telephone voice channel and digital data signals, and wherein said multiplexer means has an input coupled to receive said at least one of digital telephone voice channel and digital data signal, said multiplexer means controllably coupling selected ones of said digital data and digital telephone voice channel signal and the N outputs of said selector means for transmission as part of a first message over said first optical fiber to said remote sites.

18. A fiber optic communication system according to claim 17, wherein said fourth means further includes means for coupling, to a subscriber's equipment, a signal that has been demultiplexed from a first message.

19. A fiber optic communication system according to claim 7, wherein backup electrical power for a respective remote site is provided by way of a battery unit contained within a protective subterranean housing arrangement at said remote site, said protective subterranean housing arrangement comprising a first, interior chamber defined by a first interior tubular member, a second exterior chamber defined by a second, exterior tubular member, surrounding said interior tubular member, a cover member sealing one end of said interior tubular member and being secured to one end of said exterior tubular member, said battery unit being retained within said interior tubular member, said arrangement being supported in a subterranean vertical position so as to form a bell jar-configured housing surrounding and protecting said battery unit from the subterranean intrusion of standing water by column pressure within said interior tubular member.

20. A subterranean housing arrangement for protecting at least one electrical component comprising a first, interior chamber defined by a first interior tubular member, a second exterior chamber defined by a second, exterior tubular member, surrounding said interior tubular member, a cover member sealing one end of said interior tubular member and being secured to one end of said exterior tubular member, said at least one electrical component being retained within said interior tubular member, said arrangement being supported in a subterranean vertical position so as to form a bell jar-configured housing surrounding and protecting said at least one electrical component from the subterranean intrusion of standing water by column pressure within said interior tubular member.

* * * * *